United States Patent
Takahata et al.

(10) Patent No.: US 6,704,274 B2
(45) Date of Patent: Mar. 9, 2004

(54) OPTICAL RECORDING DISC

(75) Inventors: Hiroaki Takahata, Tokyo (JP); Hisaji Oyake, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/193,222

(22) Filed: Jul. 12, 2002

(65) Prior Publication Data

US 2003/0012124 A1 Jan. 16, 2003

(30) Foreign Application Priority Data

Jul. 12, 2001 (JP) ........................................ 2001-212872

(51) Int. Cl.⁷ ................................................. G11B 7/24
(52) U.S. Cl. ..................................................... 369/275.4
(58) Field of Search ........................... 369/275.4, 275.2, 369/275.3, 277, 278, 279, 13.55, 13.54; 428/64.1, 64.4, 64.3; 430/320, 321

(56) References Cited

U.S. PATENT DOCUMENTS

| | | | | |
|---|---|---|---|---|
| 6,128,270 A | * | 10/2000 | Nishikawa | 369/275.4 |
| 6,181,672 B1 | * | 1/2001 | Muramatsu et al. | 369/275.4 |
| 6,490,240 B1 | * | 12/2002 | Usami | 369/275.4 |
| 6,498,777 B2 | * | 12/2002 | Takahata et al. | 369/280 |
| 6,590,857 B2 | * | 7/2003 | Ohkubo et al. | 369/275.4 |

FOREIGN PATENT DOCUMENTS

| | | |
|---|---|---|
| JP | 2000-187887 | 7/2000 |
| JP | 2000-200446 | 7/2000 |
| JP | 2000-222780 | 8/2000 |
| JP | 2000-353321 | 12/2000 |
| JP | 2000-353342 | 12/2000 |

* cited by examiner

*Primary Examiner*—Tan Dinh
(74) *Attorney, Agent, or Firm*—Oblon, Spivak, McClelland, Maier & Neustadt, P.C.

(57) ABSTRACT

A groove is present in a surface of a disc substrate. A part of the groove is curved toward another groove adjacent to the groove to thereby form a land pre-pit.

The following relations hold among $D_G$, $D_P$ and $r$:

$$0.267 \leq (D_P/D_G)^2 \cdot r \leq 0.701;$$

and $$3.185 \leq (D_P/D_G)/r \leq 8.553,$$

where
  $D_G$: depth of the groove 4B,
  $D_P$: depth of the land pre-pit 5A,
  $r$ [$\mu$m]: distance between the center of the land pre-pit 5A and the center line of the groove 4B having the curved land pre-pit 5A.

2 Claims, 3 Drawing Sheets

LASER BEAM

OPTICAL RECORDING DISC

BACKGROUND OF THE INVENTION

The present invention relates to an optical recording disc.

The optical recording disc is categorized into a write-once optical disc which uses an organic dye for the recording material, such as CD-R and DVD-R, and a rewritable type optical disc which uses a phase-change recording material for the recording material, such as CD-RW and DVD-RW. In each of those optical recording discs, a recording layer is formed on a disc substrate in which a tracking groove (guide groove) is spirally formed. Record marks are formed in the groove to thereby effect the groove recording.

In the optical recording disc, it is necessary to previously record pre-format information, such as synchronization signal and address information, in a surface of the disc substrate. The pre-format information may be recorded by wobbling the groove. The pre-pits having the pre-format information may be formed instead of the groove wobbling. In a case where the pre-format information is recorded by using only the groove wobbling, if the recording track pitch is narrowed in order to increase the recording capacity, it is impossible to obtain a sufficiently high modulation degree. Further, signal leakage from the adjacent groove occurs to possibly deteriorate the CNR (carrier to noise ratio). To cope with this, in the DVD-R and DVD-RW in which information is recorded at high density, the groove is wobbled and further a land pre-pit format is employed in which pre-pits are formed in areas (called lands) each between adjacent grooves. In the land pre-pit format, a recording or reproducing laser beam is tracked by the groove and converged onto the groove. The pre-pits are detected by reading a difference signal derived from a light receiving element, which is divided into two segments in the radial direction of the optical disc.

A general method of manufacturing the disc substrate will be described.

A disc substrate is manufactured in a manner that resin is injection molded by using a stamper having a matrix pattern for the pre-pits and grooves. Usually, the stamper is made of Ni (nickel). To manufacture the stamper, a master disc is formed, and then a master stamper, a mother stamper, a child stamper and the like are formed from the master disc.

The master disc is generally manufactured in the following steps. To start with, a resist layer made of resist material, such as a photo-resist, is formed on a surface of a rigid substrate made of glass. The resist layer is exposed by an exposure beam, such as a laser beam, to thereby form a latent image pattern on the resist layer, and then the latent image pattern is developed. In this way, the resist layer is patterned to complete the master disc.

To form a stamper by using the master disc, a Ni thin film is formed by sputtering or electroless plating to give the surface of the resist layer of the master disc an electrical conductivity. Next, electrocating process is carried out using the Ni thin film as a substrate to thereby form a Ni electroformed film. A laminated layer consisting of the Ni thin film and the Ni electroformed film is peeled from the resist layer, and is used as a master stamper. The mother stamper is manufactured in a manner that a Ni electroformed film is formed on the surface of the master stamper, and the Ni electroformed film is peeled therefrom. In this case, preparation is made in advance such that the surface of the master stamper is oxidized so as to make it easy to peel off the Ni electroformed film. By similar process, the child stamper is manufactured by using the mother stamper.

In the manufacturing process of the master disc, when a latent image pattern corresponding to a spiral groove is formed, the beam is spirally moved for scanning. To form pre-pits between the grooves, two beams are used for forming a latent image pattern. One of the beams is continuously irradiated to form a groove pattern, while the other beam is intermittently irradiated to form a pre-pit pattern. The method for forming the latent image pattern by using two beams will be referred to as a "two-beam method" in the specification. A partial plan view of a disc substrate thus manufactured by the two-beam method is shown in FIG. 3A, and a cross sectional view of the same taken on line B—B in FIG. 3A is shown in FIG. 3B. In FIG. 3A, grooves 4D, 4E and 4F and lands 3D, 3E and 3F are alternately arranged on a disc substrate 2. A pre-pit 5B is formed in the land 3E. The pre-pit 5B is continuous to two grooves 4D and 4E adjacent to the pre-pit. Those grooves and pre-pits are formed in a ladder shape, as a whole.

Japanese patent publication Nos. 2000-200446 and 2000-353321 point out the following problem. In an optical disc in which the grooves and the pre-pits are formed in a ladder shape, when record marks or information pits are formed at positions adjacent to the land pits, the record marks and the information pits expand onto the land pre-pits. As a result, such a problem arises that it is impossible to accurately reproduce the land pre-pit signals. In Japanese patent publication No. 2000-200446, the groove depth and the land pre-pit depth are different from each other in order to suppress the expansion of the record mark onto the land pre-pit. In Japanese patent publication No. 2000-353321, the width of the groove is narrowed at a position adjacent to the land pre-pit. With this, even in the case of the information pit formed extending onto the land pre-pit, a ratio of the pit area to the pit length is equal to that in the case of the normal information pit.

Japanese patent publication No. 2000-187887 proposes such a technique that in order to accurately reproduce preformat information of the land pre-pits, the land pre-pit is formed while leaving one part of the inner or outer peripheral side of the land.

Japanese patent publication Nos. 2000-187887 and 2000-353321 propose such a technique that to form the grooves and the land pre-pits having shapes as described in those publications, when the master disc is formed, a part of the groove is curved toward the groove adjacent to the former by deflecting or biasing one exposure beam (see FIG. 6 in Japanese patent publication No. 2000-187887 and FIG. 12 in Japanese patent publication No. 2000-353321). In this technique, the curved part of the groove serves as a land pre-pit. On the technique, the Japanese patent publication No. 2000-187887 points out such an advantage that since no laser beam for the pre-pit formation is required, the optical system of the master disc exposure device is simple.

In the optical recording disc of the type in which a part of the groove is curved and used for the land pre-pit, the shape of the land pre-pit is greatly different from that in the conventional optical disc, which is manufactured from the master disc by the two-beam method. Therefore, it is estimated that the conditions that the land pre-pit should satisfy in order to obtain good reproduction characteristics are greatly different from those for the conventional optical disc. However, little consideration is given to those conditions in both the publications referred to above.

SUMMARY OF THE INVENTION

Accordingly, an object of the present invention is to reproduce both the pre-pit reproducing signal and the record mark reproducing signal in an excellent level in an optical recording disc of the type in which the groove recording is carried out, and one of two adjacent grooves is curved in part toward the other groove and the curved part serves as a land pre-pit.

1) To achieve the above object, there is provided an optical recording disc having a disc substrate and a recording layer, in which a spiral or concentric groove is formed in a recording-layer forming surface of said disc substrate, and the groove recording is performed, wherein a groove is curved in part toward another groove adjacent to said curved groove to thereby form a land pre-pit, and wherein the following relations hold among $D_G$, $D_P$ and r:

$$0.267 \leq (D_P/D_G)^2 \cdot r \leq 0.701;$$

and $$3.185 \leq (D_P/D_G)/r \leq 8.553,$$

where $D_G$: depth of the groove having the land pre-pit,
$D_P$: depth of the land pre-pit,
r (μm): distance between the center of the land pre-pit and the center line of the groove having the land pre-pit curved therefrom.

2) In the optical recording disc thus constructed, said land pre-pit and said groove may be shaped like V in cross section.

DETAILED DESCRIPTION OF THE PREFERRED EMBODIMENT

Figure 1A:
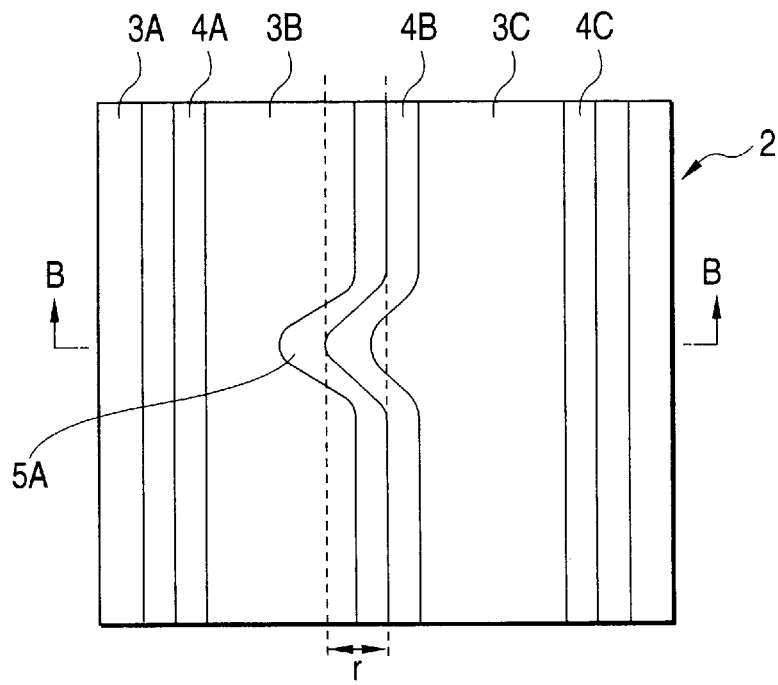
FIG. 1A is a plan view schematically showing a part of an optical recording disc constructed according to the present invention.
Figure 1B:
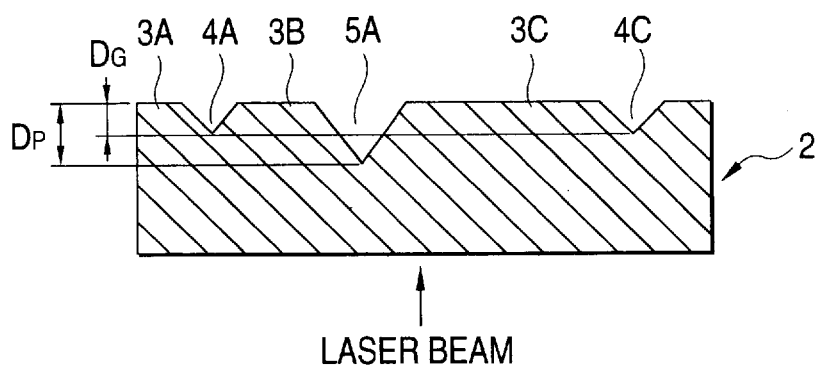
FIG. 1B is a cross sectional view taken on line B—B in FIG. 1A.

An optical disc of the invention has a disc substrate and a recording layer. A spiral or concentric groove is formed in a recording-layer forming surface of the disc substrate. A plan view schematically showing a part of this disc substrate is shown in FIG. 1A. A cross sectional view taken on line B—B in FIG. 1A is shown in FIG. 1B. In FIG. 1A, grooves 4A, 4B and 4C and lands 3A, 3B and 3C are alternately arranged on a disc substrate 2. A part of the groove 4B is bent toward the groove 4A adjacent to the former. This part serves as a land pre-pit SA. The land pre-pit 5A is not continuous to the groove 4A adjacent to the groove 4B. In the optical disc having the disc substrate 2, a recording or reproducing laser beam enters the optical disc from the lower side thereof in the figure, and transmits through the disc substrate 2 and reaches the recording layer (not shown).

In the present invention, $D_G$, $D_P$ and r are selected to so as to satisfy the following relations:

$$0.267 \leq (D_P/D_G)^2 \cdot r \leq 0.701;$$

and $$3.185 \leq (D_P/D_G)/r \leq 8.553,$$

more preferably, $$0.459 \leq (D_P/D_G)^2 \cdot r \leq 0.604;$$

and $$4.993 \leq (D_P/D_G)/r \leq 6.869,$$

where $D_G$: depth of the groove 4B of the disc substrate,
$D_P$: depth of the land pre-pit 5A curved from the groove 4B,
r [μm]: distance between the center line of the groove 4B and the center of the land pre-pit 5A.

In the invention, the center of the land pre-pit 5A means the central position of the land pre-pit 5A in the width direction (in the radial direction of the disc) at the position where the land pre-pit is most curved. In the subsequent description, the distance r will be referred frequently to as an "outcurving amount of the pre-pit". The depth $D_P$ of the land pre-pit 5A means the maximum depth of the land pre-pit 5A.

When $(D_P/D_G)^2 \cdot r$ is smaller than the range defined by the invention, a modulation degree of a reproducing signal of the land pre-pit 5A (Land Pre-Pit Signal: LPP signal) is low, and the LPP signal having a satisfactorily high amplitude cannot be produced. When $(D_P/D_G)^2 \cdot r$ is larger than the range defined by the invention, a modulation degree of a reproducing (LPP) signal of the land pre-pit 5A (LPP signal) is excessively large, and an error will be induced in the reproducing signal.

In the optical disc having the pre-pits, when the record mark formed in the recording layer is read out, i.e., the recorded signal is reproduced, light reflected from the land pre-pit is introduced, as a phase difference signal, into the reproducing signal, and it acts as noise. This results in an error. If $(D_P/D_G)/r$ is put within the range defined by the invention, however, the error thus produced may be reduced to such a level as to be practically negligible.

In the invention, it is satisfactory that a relation among $D_G$, $D_P$ and r is set as described above in an area on the surface of the disc substrate where at least the groove and the pre-pit are both present. In other words, the depth of groove may be changed in a part of the groove. In this case, however, the depth $D_G$ preferably satisfies the relations mentioned above over the entire groove. Further, the depth of the groove is preferably uniform over the entire groove, as shown in FIG. 1B.

The definition on the relation among $D_G$, $D_P$ and r, which is made by the invention, is more effective for a case where the cross section of each of the land pre-pit and the groove, which is observed in the cross section of the disc substrate shown in FIG. 1B, i.e., its cross section including the disc radial direction, is shaped like V.

The following cases, for example, may be given for the case where the land pre-pit and the groove are shaped like V in cross section. In the DVD-RW, it is necessary that the pre-pits (referred to as "signal pits") holding disc identifying information are each formed in the inner peripheral part of the disc, which is located on the inner side of the user recording area. In order to enable the normal DVD player to read the signal pits, it is necessary to set the depth of the signal pit at a depth comparable with the depth of the pre-pit of the reproduction only DVD, exactly 60 to 120 nm. If the groove depth is approximately 60 to 120 nm, the amount of reflection light is considerably reduced by the light interference. To avoid this, it is necessary that the groove is shallower than the signal pit. In the manufacturing of the optical recording disc, to form patterns of different depths, the cross section of the pattern having a shallower depth is shaped like V, as will be seen from the master disc description to be given later.

The useful effects of the invention may be produced if $(D_P/D_G)^2 \cdot r$ and $(D_P/D_G)/r$ are selected to be within the ranges defined by the invention. In actual design of the optical recording disc, a designer first determines an optimum groove depth $D_G$ corresponding to the reproducing wavelength. For example, in an optical disc designed such that the reproducing wavelength is set at 645 to 660 nm according to the DVD-RW standard, the groove depth $D_G$ is selected to be within 20 to 40 nm, the groove width is selected to be within 0.15 to 0.30 µm, and the groove array pitch (recording track pitch) is selected to be within 0.6 to 0.9 µm, the tracking servo signal (push-pull signal) is sufficiently large, and the jitter of the reproducing signal is reduced. Next, the land pre-pit depth $D_P$ and the distance r are determined from the groove depth $D_G$ according to the present invention.

The disc substrate used in the invention is injection molded by using the stamper, like the conventional disc substrate.

In the invention, to manufacture the master disc, a resist layer of positive type is formed on the surface of a rigid substrate, such as a glass substrate, and a step of patterning the resist layer is executed. In the step, the resist layer is exposed by an exposure beam, such as a laser beam, to form a latent image pattern, and the latent image pattern is developed. In the invention, the resist layer is exposed in a manner that one exposure beam is continuously irradiated on the resist layer so as to allow the formation of a groove, while rotating the master disc. At a position where the land pre-pit is to be formed, the exposure beam is momentarily displaced in the radial direction of the master disc. Also during the displacing of the exposure beam, the exposure beam is continuously irradiated. By controlling the displacing amount of the exposure beam, an outcurving amount r of the land pre-pit 5A curved from the groove 4B may be controlled. The depth $D_P$ of the land pre-pit 5A may be set to be larger than the depth $D_G$ of the groove 4B in a manner that the beam intensity is increased when the exposure beam is displaced, and it is returned to its original intensity when the exposure beam is returned to the original position.

In the invention, in order that the groove and the pre-pit are configured to have a V-like shape in cross section, and that the pre-pit depth $D_P$ is deeper than the groove depth $D_G$, the exposure beam is irradiated onto the master disc in the following manner. When the latent image patterns of the groove and the pre-pit are formed, the intensity of the exposure beam is relatively weak to such an extent that the beam does not reach the bottom surface of the resist layer. When the latent image pattern of the pre-pit is formed, the exposure beam is more intensive than the exposure beam to form the groove latent image. When the signal pit, which is deeper than the groove and the land pre-pit, is formed as in the DVD-RW mentioned above, the intensity of the exposure beam is higher than that of the exposure beam to form the land pre-pit. Usually, the intensity of the irradiated exposure beam is selected to such an extent that the beam reaches the bottom surface of the resist layer. In this way, the grooves and the land pre-pits, which are shaped like V in cross section, and the signal pits, which are deeper than the former and rectangular in cross section, are formed in a single disc.

The disc having a structure shown in FIG. 1B may be formed by using a stamper having undergone an odd number of information transferring operations, such as a master stamper having undergone one time of information transferring from a master disc, or a child stamper having undergone three times of information transferring operations. It is noted that a disc having a disc substrate, which is manufactured by using a stamper having undergone an even number of information transferring operations, such as a mother stamper, is also involved in the invention.

Figure 2:
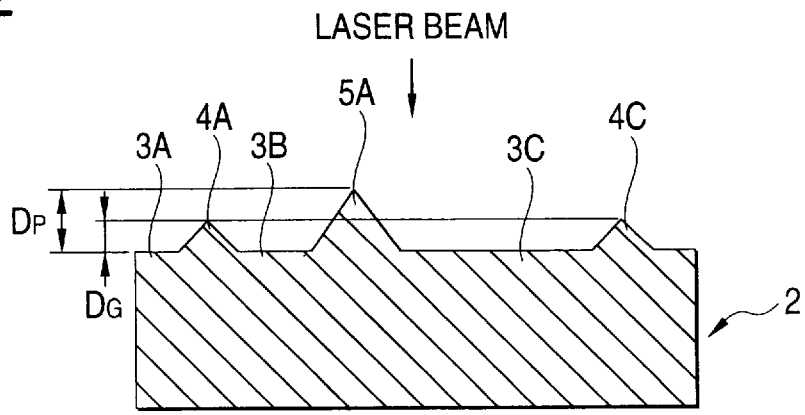
FIG. 2 is a cross sectional view showing a part of the optical recording disc of the invention.
Figure 3A:
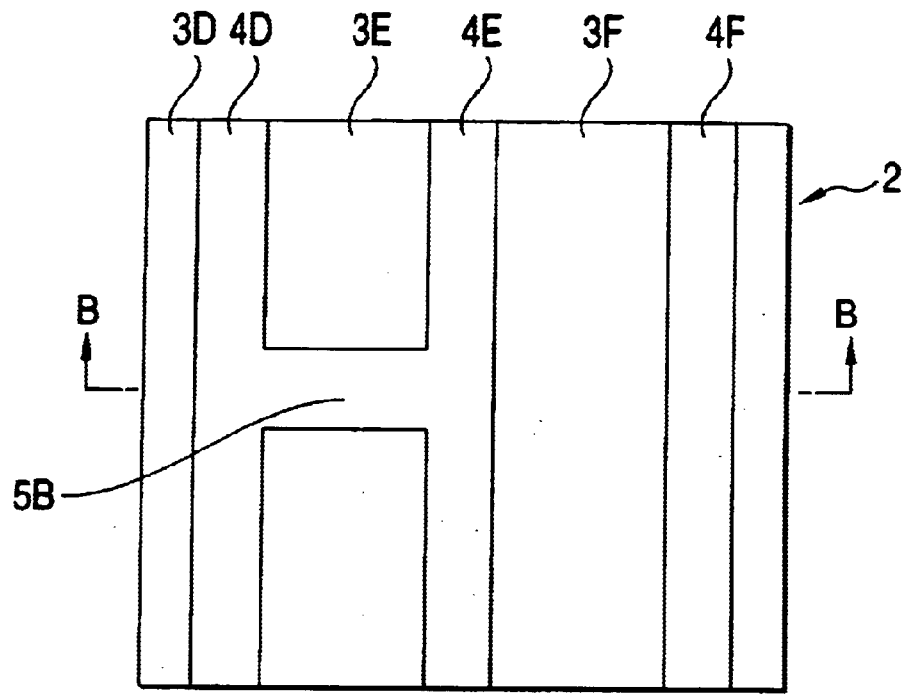
FIG. 3A is a plan view schematically showing a part of a conventional optical recording.
Figure 3B:
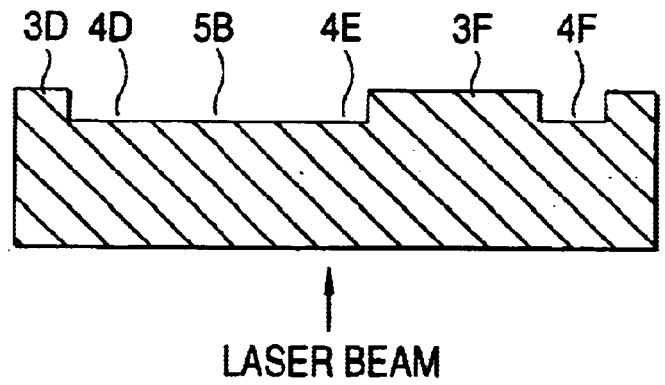
FIG. 3B is a cross sectional view taken on line B—B in FIG. 3A.

In a disc substrate, which is manufactured by using a stamper having undergone an even number of operations of transferring information from a master disc, its surface has a recessed/projected pattern which is an inversion of that of FIG. 1B, as shown in FIG. 2. More exactly, the grooves and land pre-pits are projected and the lands are recessed. In this case, if the groove height and the height of the land pre-pit are selected to be respectively equal to the groove depth $D_G$ and the pre-pit depth $D_P$, the effects of the invention will be produced.

In FIG. 2, a recording or reproducing laser beam is incident on the the upper side (as viewed in the figure) of a recording layer (not shown) formed over a groove forming surface of the disc substrate 2. In such a structure, usually, a light-transmitting substrate or layer is formed on the recording layer. This substrate or layer protects the recording layer and is light-transmitting to the laser beam. When the light-transmitting substrate or layer is provided, the patterns of the grooves and the land pre-pits on the disc substrate 2 are transferred to the substrate or layer. Accordingly, the light-transmitting substrate or layer may be considered to be a disc substrate that is configured and dimensioned as defined by the invention. In this case, there is no need that the disc substrate 2 be light-transmitting to the laser beam.

The light-transmitting substrate or layer may be a resin layer formed by coating process, a resin sheet stuck to the recording layer, or a member formed by sticking a flexible or rigid plate-like sheet made of resin or glass onto an adhesive layer. The light-transmitting layer, which is formed with a resin layer or resin sheet, may be reduced in thickness to be about 300 µm or smaller. Accordingly, the optical disc constructed using such a light-transmitting layer is advantageous for a case where an optical pickup using an objective lens having a high NA of, for example, 0.75 to 0.95 is used for information reproduction. When the NA is increased to be high, the coma aberration becomes large. Accordingly, the tilt margin of the pickup is small. This is improved by use of the thin light-transmitting layer, however. Incidentally, the light-transmitting layer may be made of an inorganic material, such as oxide, nitride, carbide or carbon. The light-transmitting layer made of inorganic material may be reduced in thickness to be about 500 nm or smaller.

In the optical disc of the invention, materials constituting the disc substrate are not limited to specific ones in particular. Any material may be selected from among resins that are available for the injection molding, such as polycarbonate, polymethyl methacrylate and polyolefin. A thickness of the substrate is not limited to a specific value of thickness, in particular. It may be selected to have such a thickness as to allow a high precision pattern formation by the injection molding. Normally, it is preferably within a range of 0.3 to 1.5 mm.

In the invention, other materials than the resin may be used for the disc substrate. The groove, land and pre-pit patterns maybe formed by a 2P (photopolymer) method, for example. Also in this case, the effects of the invention are produced as a matter of course. In this case, the disc substrate includes a glass plate and a 2P resin formed on the former. In the 2P method, a resin plate or a metal plate may be used in place of the glass plate. The disc substrate may be formed, for example, in a manner that glass, molten or softened, is molded with a stamper.

The invention is applicable for various types of optical discs in which the grooves are used as recording tracks, and land pre-pits are provided, for example, discs using the phase-change recording material or discs using the organic dye for the recording material. The effects of the invention is remarkable in particular, when it is applied to the disc using the phase-change recording material. In the case of the disc using the phase-change recording material, its general structure is such that a first dielectric layer, a recording layer, a second dielectric layer and a reflecting layer are arranged in this order from this side to the inner part when viewed in the laser beam incident side. The phase-change recording material may be an alloy of Sb—Te, Ag—In—Sb—Te, Ge—Sb—Te or the like. A general structure of the disc using the organic dye is such that a recording layer and a reflecting layer are arranged in this order from this side to the inner part when viewed in the laser beam incident side. The organic dye may be phthalocyanine dye, cyanine dye, azo dye, or the like. When the present invention is applied to those discs, any limitation is not put on other parts than the substrate, and those other parts may be substantially the same as those of the conventional disc.

EXAMPLE

An optical disc including a disc substrate 2 having a structure as shown in FIG. 1A has been manufactured in the following procedure.

To start with, the surface of an optically polished glass substrate is treated by coupling agent, and then a photo-resist layer is formed thereon by spin coating, and residual solvent is evaporated. A thickness of the photo-resist layer is 90 nm.

The photo-resist layer is exposed by a single laser beam, while rotating the glass substrate, thereby forming latent image patterns which are to be matrices of the grooves and the land pre-pits. The laser wavelength is 351 nm, and the numerical aperture (NA) of the laser beam irradiating optical system is 0.9. A groove array pitch (recording track pitch) is 0.74 μm, and a groove width is 0.20 μm. The groove is a spiral groove, and it is wobbled by using a single signal. The single signal is used for controlling the number of revolutions of the disc and the clock frequency for the recording signal.

In forming a latent image of the land pre-pits, a land pre-pit signal is superimposed on the single signal for wobbling the groove, and the laser beam is momentarily displaced in the radial direction of the master disc at a position where the land pre-pit is formed. An outcurving amount r of the pre-pit from the groove is controlled by controlling the displacement amount of the laser beam. The depth $D_P$ of the land pre-pit is controlled in a manner that a signal for correcting an intensity of the laser beam is output in synchronism with the land pre-pit signal, and an intensity of the laser beam is varied in synchronism with a displacement of the laser beam. The groove depth $D_G$ is set at a value within 25 to 35 nm.

Subsequently, the resultant structure is developed. A plurality of master discs which are different in the values of $(D_P/D_G)^2 \cdot r$ and $(D_P/D_G)/r$ are manufactured. In those master discs thus manufactured, the grooves and the pre-pits are shaped like V in cross section.

Subsequently, to make the surface of the photo-resist layer conductive, a Ni thin film is formed by electroless plating, and is electroformed using the Ni thin film as a substrate to thereby forming a Ni electroformed film. A laminated layer consisting of the Ni thin film and the Ni electroformed film is peeled off the resist layer, and is used as a master stamper. Following this, the rear surface of the resultant master disc is polished, and a master stamper is formed.

By using the master stamper, a disc substrate (120 mm in diameter, 0.6 mm in thickness) of polycarbonate is manufactured by injection molding. A first dielectric layer, a phase-change type recording layer, a second dielectric layer, a reflecting layer, and a resin protecting layer are formed, in this order, on the groove forming surface of the disc substrate.

The recording layers of those optical recording discs are initialized (crystallized) by a bulk eraser, and then a modulation degree of the land pre-pit signal is measured. Further, a signal for DVD format is recorded in the recording layer of each optical recording disc, and the number of errors occurred in reproducing the recorded signal is reproduced, is counted. The conditions for the evaluating device used for those measurements are:

laser wavelength=650 nm;

NA of the objective lens=0.60; and linear velocity=3.5 m/s.

Figure 4:
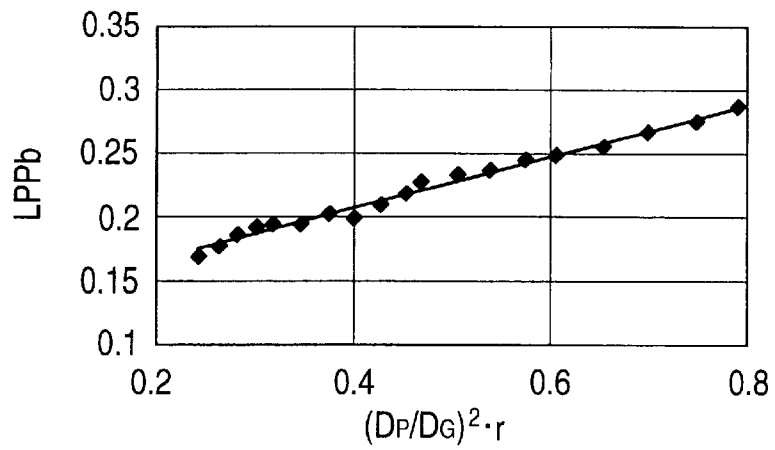
FIG. 4 is a graph showing a relationship between $(D_P/D_G)^2 \cdot r$ and a modulation degree LPPb of a land pre-pit signal.
Figure 5:
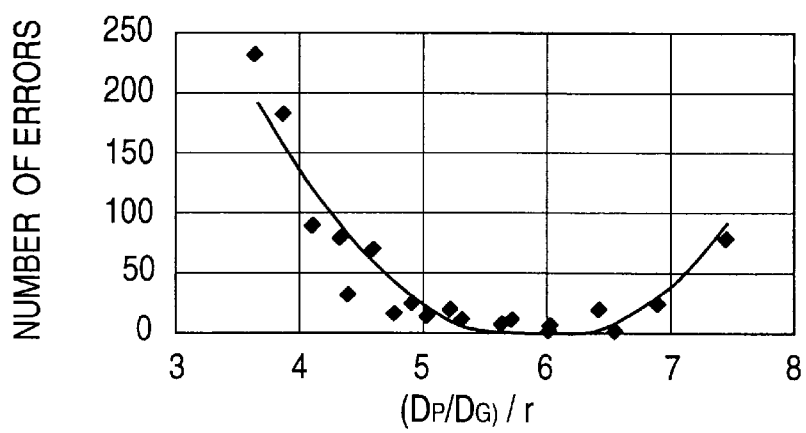
FIG. 5 is a graph showing a relationship between $(D_P/D_G)^2 \cdot r$ and the number of errors occurring at the time of reproducing operation.

At the time of recording/reproducing operation, the laser beam is incident on the recording layer through the disc substrate. A relationship between $(D_P/D_G)^2 \cdot r$ and a modulation degree of a land pre-pit signal (LPPb), is shown in FIG. 4. A relationship between $(D_P/D_G)/r$ and the number of errors occurring at the time of reproducing operation, is shown in FIG. 5.

As seen from FIG. 4, if the following relations are set up according to the invention, $$0.267 \leq (D_P/D_G)^2 \cdot r \leq 0.701,$$

preferably, $$0.459 \leq (D_P/D_G)^2 \cdot r \leq 0.604,$$

the modulation degree of the land pre-pit signal takes an appropriate value within a range of 0.18 to 0.27, preferably 0.22 to 0.25.

As shown in FIG. 5, if the following relation is set up according to the invention, $$4.993 \leq (D_P/D_G)/r \leq 6.869,$$

the number of errors occurring in reproducing the recording signal is 28, extremely small. Further, similar measurement is conducted on $(D_P/D_G)/r$ of broader ranges. The measurement results showed that if $3.185 \leq (D_P/D_G)/r \leq 8.553$, the number of errors falls within a range (equal or less than 280) within which no problems arise in practical use.

Figure 6:
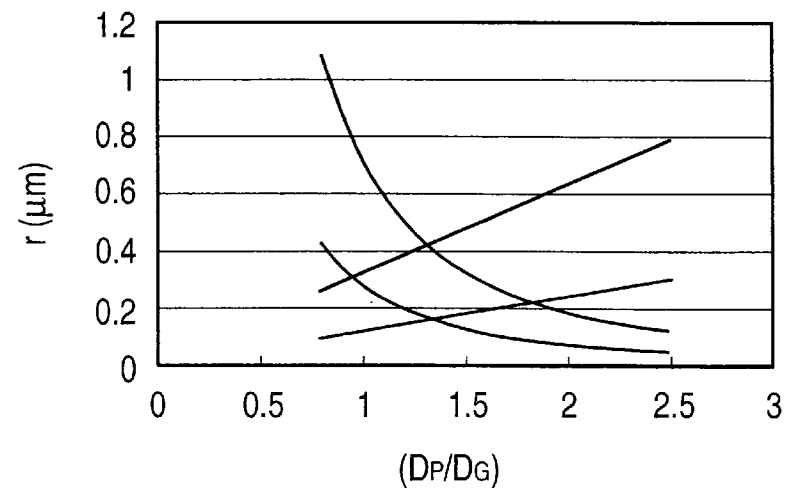
FIG. 6 is a graph showing a relationship between $D_P/D_G$ and r.

A relation between $D_P/D_G$ and r, which is calculated from $0.267 \leq (D_P/D_G)^2 \cdot r \leq 0.701$ and $3.185 \leq (D_P/D_G)/r \leq 8.553$, is shown in FIG. 6. In the figure, an area enclosed by four lines is a range defined by the invention.

In the process of manufacturing the optical recording disc of the invention, when the resist layer is exposed in the master disc manufacturing step, one exposure beam is continuously irradiated on the resist layer, and at a position where the land pre-pit is to be formed, the exposure beam is momently displaced in the radial direction of the master disc. As a result, the grooves are bent and this bent part serves as the land pre-pit. Thus, in this manufacturing method, there is no need of individually controlling two beams at the time of exposing the resist layer. Therefore, the construction and control of the exposure device are simple.

In the invention, in the optical recording disc manufactured by such a method, the groove depth $D_G$, the land pre-pit depth $D_P$, and the outcurving amount r of the pre-pit from the groove are properly selected. Therefore, the modulation degree of the land pre-pit signal is put within a proper range. Further, the occurrence of errors caused by the land pre-pit when the recording signal is reproduced is suppressed.

What is claimed is:

1. An optical recording disc comprising:
    a disc substrate;
    a recording layer formed above a first surface of said disc substrate;
    a spiral or concentric groove formed in the first surface of said disc substrate to perform the groove recording; and
    a land pre-pit formed by said groove being curved in part toward another groove adjacent to said curved groove,
    wherein the following relations hold among $D_G$, $D_P$ and r:

$$0.267 \leq (D_P/D_G)^2 \cdot r \leq 0.701;$$

and $$3.185 \leq (D_P/D_G)/r \leq 8.553,$$

where
    $D_G$: depth of the groove having the land pre-pit,
    $D_P$: depth of the land pre-pit,
    r [μm]: distance between the center of the land pre-pit and the center line of the groove having the curved land pre-pit.

2. The optical recording disc according to claim 1, wherein said land pre-pit and said groove are shaped like V in cross section.

* * * * *